United States Patent
Koukou et al.

(10) Patent No.: US 12,441,488 B2
(45) Date of Patent: Oct. 14, 2025

(54) AUXILIARY DATA FOR CONTROLLING A SATELLITE

(71) Applicant: ICEYE OY, Espoo (FI)

(72) Inventors: Melina Koukou, Espoo (FI); Abhishek Agrawal, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/859,796

(22) PCT Filed: Apr. 25, 2023

(86) PCT No.: PCT/EP2023/060826
§ 371 (c)(1),
(2) Date: Oct. 24, 2024

(87) PCT Pub. No.: WO2023/208943
PCT Pub. Date: Nov. 2, 2023

(65) Prior Publication Data
US 2025/0115374 A1    Apr. 10, 2025

(30) Foreign Application Priority Data
Apr. 28, 2022   (GB) .................................. 2206232

(51) Int. Cl.
*B64G 1/24*      (2006.01)
*G01S 19/39*    (2010.01)

(52) U.S. Cl.
CPC .............. *B64G 1/242* (2013.01); *B64G 1/245* (2023.08); *G01S 19/393* (2019.08)

(58) Field of Classification Search
CPC ........ B64G 1/242; B64G 1/245; G01S 19/393
See application file for complete search history.

(56) References Cited

U.S. PATENT DOCUMENTS

| 6,133,870 A | 10/2000 | Wehner |
| 10,739,468 B2 | 8/2020 | Gogliettino |
| 10,809,388 B1 * | 10/2020 | Carcanague .......... G01S 19/252 |
| (Continued) | | |

FOREIGN PATENT DOCUMENTS

| CN | 101910862 B * | 2/2013 | ............. G01S 19/25 |
| JP | 2006029914 A | 2/2006 | |
| (Continued) | | | |

OTHER PUBLICATIONS

PCT Written Opinion and Search Report issued in related PCT Patent Application No. PCT/EP2023/060826 date Jul. 21, 2023.
(Continued)

*Primary Examiner* — Hunter B Lonsberry
*Assistant Examiner* — Jalal C Coduroglu
(74) *Attorney, Agent, or Firm* — Cozen O'Connor

(57) ABSTRACT

The present disclosure relates to a method of generating auxiliary data for controlling a satellite travelling in orbit around Earth, the method comprising: receiving tracking data for the satellite; applying an orbit determination algorithm including: estimating an orbit for the satellite based on the tracking data; and predicting, based on the estimated orbit, future ephemerides data of the satellite; generating auxiliary data comprising predicted future ephemerides data; and transmitting the auxiliary data to the satellite for use in the satellite's attitude and orbit control.

20 Claims, 9 Drawing Sheets

(56) References Cited

U.S. PATENT DOCUMENTS

| | | | |
|---|---|---|---|
| 2006/0012517 A1* | 1/2006 | Nagahara | G01S 19/20 342/357.46 |
| 2007/0118286 A1* | 5/2007 | Wang | G01S 19/47 342/357.65 |
| 2007/0255495 A1* | 11/2007 | Alexander | G01S 19/47 701/474 |
| 2008/0154502 A1 | 6/2008 | Tekawy et al. | |
| 2008/0177430 A1 | 7/2008 | Tekawy et al. | |
| 2012/0286991 A1* | 11/2012 | Chen | G01S 19/32 342/357.23 |
| 2013/0332072 A1 | 12/2013 | Janky et al. | |
| 2014/0057649 A1* | 2/2014 | Han | H04W 4/025 455/456.1 |
| 2015/0219744 A1* | 8/2015 | Eikenberry | G01S 5/163 348/144 |
| 2015/0230175 A1* | 8/2015 | Grant | H04W 52/0216 370/329 |
| 2016/0214742 A1* | 7/2016 | Carroll | G01P 21/00 |
| 2021/0247519 A1* | 8/2021 | Reid | G01S 19/072 |
| 2021/0341944 A1* | 11/2021 | Schoon | G06F 16/1744 |
| 2021/0356275 A1* | 11/2021 | Choi | G01C 21/24 |
| 2022/0317312 A1* | 10/2022 | Sharma | H04W 4/40 |
| 2022/0398448 A1* | 12/2022 | Jayaraman | G06N 3/044 |

FOREIGN PATENT DOCUMENTS

| | | |
|---|---|---|
| JP | 2011503554 A | 1/2011 |
| JP | 2015534360 A | 11/2015 |
| WO | 2009059429 A1 | 5/2009 |

OTHER PUBLICATIONS

Great Britain Office Action issued in connection with related Great Britain Patent Application No. GB 2206232.7 dated Oct. 22, 2024.
Great Britain Office Action issued in connection with related Great Britain Patent Application No. GB 2206232.7 dated Oct. 21, 2022.
Great Britain Office Action issued in connection with related Great Britain Patent Application No. GB 2206232.7 dated Jun. 17, 2024.
Korean Office Action issued in related Korean Patent Application No. 10-2024-7038129, dated Mar. 21, 2025. With English translations.
Canadian Office Action, for Canadian Application No. 3,250,385, dated Jun. 4, 2025, 4 pages.
Notice of Reasons for Refusal, issued in corresponding Japanese Application No. 2024-563571, dated Jun. 2, 2025, 7 pages (with English Translation).

* cited by examiner

AUXILIARY DATA FOR CONTROLLING A SATELLITE

This application is the National Stage filing under 35 U.S.C. 371 of International Application No. PCT/EP202 70 0826 filed on 2023 Apr. 25, which claims priority to GB Application No. 2206232.7 filed on 28 Apr. 2022, the contents of both of which are hereby incorporated by reference herein in their entirety to the extent permitted by law The present disclosure relates to a method and ground segment for generating auxiliary data for controlling a satellite travelling in orbit around Earth as well as a satellite for travelling in orbit around Earth using the auxiliary data.

BACKGROUND

On-board knowledge of satellite position is vital to all space missions. For earth observation missions, very precise knowledge of satellite position is required, particularly but not exclusively when using small satellites. Positioning errors of more than 500 m may already not be acceptable for certain payloads such as, for example, Synthetic Aperture Radar 'SAR' imaging. Satellites equipped with Global Positioning System 'GPS' receivers may accurately determine their orbit state without the aid of the ground segment. Thus, on-board GPS receivers may provide accurate navigation solutions. However, the system relies on periodic GPS measurements, which may not always be available.

GPS outages may have different origins, such as based on a location or a specific orientation of the satellite, where the availability and quality of GPS signals is reduced. Other reasons may be incorrectly installed GPS equipment and antenna on-board the satellite. Further, GPS signals can be degraded or blocked resulting in inaccurate data or complete loss of GPS signal.

Without a periodic update from the GPS receiver, an internal orbit propagator within a satellite's Attitude Determination and Control System 'ADCS' can start to deviate from the true orbit. For example, errors of up to 6 km in the track of a satellite can occur after a satellite loses the GPS signal lock for only one hour. Accordingly, there exists a need to obtain better knowledge of the satellite's current position in cases of GPS outages.

For controlling a satellite travelling in orbit around Earth, it is desirable to obtain on-board accurate knowledge of satellite position. This applies, for example, in situations in which measurements from an on-board GPS receiver may not be available or accurate. Accordingly, a need exists to provide on-board accurate knowledge of satellite position to ensure desired ADCS functionality during GPS outages.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter.

In a first aspect, the present disclosure provides a method of generating auxiliary data for controlling a satellite travelling in orbit around Earth, the method comprising: receiving tracking data for the satellite; applying an orbit determination algorithm including: estimating an orbit for the satellite based on the tracking data; and predicting, based on the estimated orbit, future ephemerides data of the satellite; generating auxiliary data comprising predicted future ephemerides data; and transmitting the auxiliary data to the satellite for use in the satellite's attitude and orbit control.

In some embodiments, the tracking data comprises Global Navigation Satellite System 'GNSS' sensor data, satellite laser ranging 'SLR' measurements or radar measurements of the satellite.

In some embodiments, the tracking data is indicative of a series of time and corresponding position and velocity of the satellite.

In some embodiments, the method further comprises: determining a current position of the satellite based on the auxiliary data when GNSS or GPS sensor data on board the satellite is not available or not reliable.

In some embodiments, at least the steps of applying the orbit determination algorithm and generating the auxiliary data are performed ground-based.

In some embodiments, estimating the obit for the satellite is further based on a previously estimated orbit.

In some embodiments, the tracking data corresponds to a predetermined time interval, optionally corresponding to the time between two ground station passes of the satellite.

In some embodiments, the tracking data comprises one or more gap(s) corresponding to one or more tracking outage(s) during the predetermined time interval.

In some embodiments, the method is repeated at every pass of the satellite, optionally such that tracking data is received per pass of the satellite and the generated auxiliary data is transmitted per consecutive pass of the satellite.

In some embodiments, the method is repeated in parallel for a second satellite, optionally for a plurality of satellites.

In some embodiments, the auxiliary data comprises predicted futures ephemerides in temporal intervals of up to one minute, optionally two minutes, more optionally 5 minutes, spanning over a time period of at least 6 hours, optionally at least 12 hours, more optionally at least 24 hours.

In some embodiments, the auxiliary data comprises predicted future ephemerides covering at least one orbital period of the satellite.

In some embodiments, the method further comprises the step: verifying the accuracy of the results of the orbit determination algorithm prior to generating and transmitting the auxiliary data.

In some embodiments, estimating the orbit includes filtering the tracking data to provide filtered ephemerides of the satellite.

In some embodiments, a Kalman filter is used to process the tracking data sequentially.

In some embodiments, predicting future ephemerides data of the satellite includes a propagation forward in time from the filtered ephemerides.

In some embodiments, a dynamic model is used for predicting future ephemerides data of the satellite.

In some embodiments, the method is a computer-implemented method.

In a second aspect, the present disclosure provides a ground segment for generating auxiliary data for controlling a satellite travelling in orbit around Earth, wherein the ground station system is configured to perform the method according to the first aspect.

In a third aspect, the present disclosure provides a ground segment for generating auxiliary data for controlling a satellite travelling in orbit around Earth, the ground segment comprising: a receiving module configured to receive tracking data for the satellite; an orbit determination tool kit 'ODTK' configured to apply an orbit determination algorithm including: estimating an orbit for the satellite based on the tracking data, and predicting, based on the estimated orbit, future ephemerides data of the satellite; an auxiliary data module configured to generate auxiliary data comprising predicted future ephemerides data; and a transmitting module configured to transmit the auxiliary data to the satellite for use by the satellite's attitude determination and control systems 'ADCS' unit.

In some embodiments, components of the ground segment are distributed over multiple locations, optionally different terrestrial locations.

In a fourth aspect, the present disclosure provides a use of the ground segment according to the second or third aspect for generating auxiliary data to control one or more satellite(s) travelling in orbit around Earth, wherein each of the one or more satellite(s) is configured to determine its position based on the auxiliary data.

In a fifth aspect, the present disclosure provides satellite for travelling in orbit around Earth, the satellite comprising: a receiving module configured to receive auxiliary data generated for the satellite according to the method according to the first aspect; an attitude determination and control systems 'ADCS' unit for controlling the satellite in orbit, wherein the ADCS unit is configured to determine a current position of the satellite based on the auxiliary data.

In some embodiments, the satellite further comprises: an on-board computer, wherein the on-board computer is configured to select the latest predicted ephemerides data from the auxiliary data based a current on-board time of the satellite, and an orbit propagator forming part of the ADCS unit configured to numerically propagate the selected predicted ephemerides data based on the current on-board time to determine a current position of the satellite.

In some embodiments, the satellite further comprises: a tracking module for tracking the satellite, optionally wherein the tracking module is a GPS sensor module; wherein the ADCS unit is further configured to determine a current position of the satellite based on sensor data of the tracking module, wherein the ADCS unit is configured to switch from the sensor data to the auxiliary data if the tracking module is non-functional.

In some embodiments, the satellite is a microsatellite and/or a radar satellite for earth observation.

Some embodiments of the disclosure provide a system comprising one or more computing systems each comprising at least one processor and memory, the system being configured to implement any of the methods or processes described here.

Some embodiments of the invention also provide a computer readable medium comprising instructions, for example in the form of an algorithm, which, when implemented in a computing system forming part of a satellite operating system, cause the system to perform any of the methods or processes described here.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
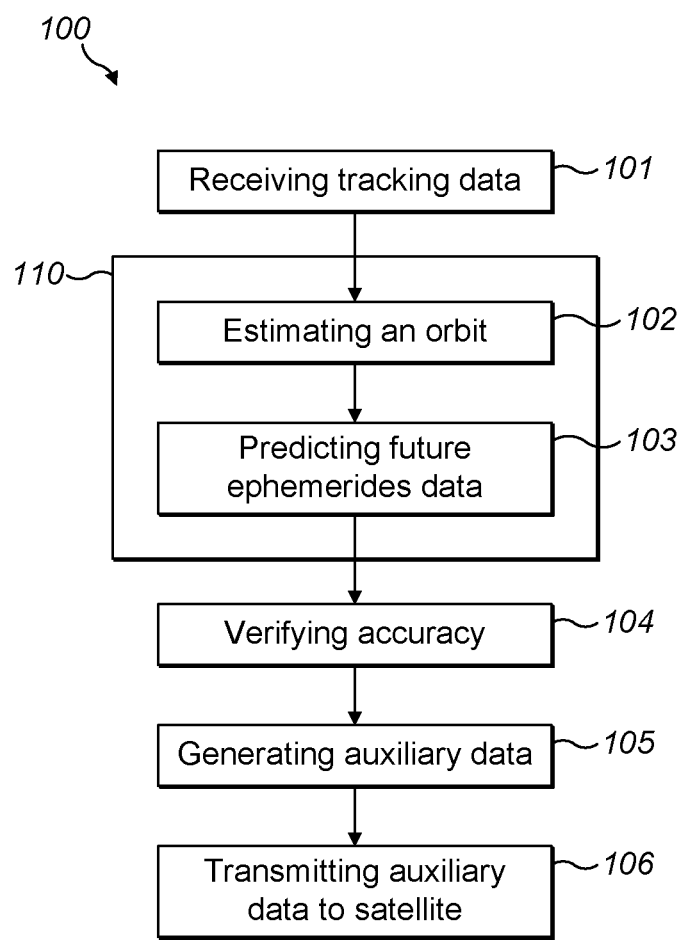
FIG. 1 is a block diagram showing a process of generating auxiliary data for controlling a satellite travelling in orbit around Earth.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides a method and ground segment for generating auxiliary data for obtaining on-board accurate knowledge of satellite position. To this end, a ground-based orbit determination 'OD' may be implemented, wherein the satellite state is estimated using received tracking data, such as GPS receiver measurements, after which a propagation algorithm predicts satellite states for a future period of time. Based on the future prediction, the auxiliary data is generated. The auxiliary data is suitable to be used by a satellite's ADCS unit instead of GPS measurements for obtaining precise knowledge of position on-board the satellite. The present disclosure further provides a satellite that is configured to receive the auxiliary data and is equipped with an ADCS unit for determining a position of the satellite based on the auxiliary data.

The present invention is based on the finding that an accuracy improvement may be achieved by using auxiliary data instead of unfiltered GPS measurements, because the noise that is inherent with GPS measurements can be filtered out before the auxiliary data is generated and fed to an internal orbit propagator on-board the satellite. Not filtering the noise from the GPS measurements has the most dominant effect in the orbit propagator deviating from the true orbit.

FIG. 1 illustrates a method of generating auxiliary data. First, at operation 101, tracking data is received for the satellite. Tracking data may be indicative of a series of time and corresponding position and velocity points for a satellite. The tracking data can be used to determine an orbit of the satellite. The tracking data may be obtained using radar or laser ranging devices from Earth stations. Additionally or alternatively, the tracking data may be obtained by Global Navigation Satellite Systems 'GNSS' receivers on-board the satellite. One well-known example for the GNSS is the Global Position System 'GPS'. In the following description, for the sake of simplicity, the tracking data is described as GPS data obtained by an on-board GPS receiver of the satellite. The GPS receiver module will be described in further detail with reference to FIG. 5.

At operation 101, tracking data may be received from the satellite itself or a tracking station tracking the satellite. The tracking data may be received directly from the satellite or tracking station or indirectly, for example, via one or more ground stations. Tracking data may be received at every ground station pass of the satellite. Typically, GPS measurements are transmitted in telemetry every ground station pass. In the case of GPS data, the tracking data comprises at least position and velocity vectors and timestamps. The GPS data may correspond to GPS measurements 30 seconds apart from each other. The GPS data may correspond to at least one full orbit period.

At operation 110, an orbit determination 'OD' method is applied to the tracking data. In this step, an orbit is (re)estimated based on the received tracking data (and previously estimated orbit). OD is the method of estimating the state, such as position and velocity, of an orbiting object, such as a satellite. OD is well known in the art of satellite operation and may be described as a filtering method to integrate observation and orbit dynamic equations to estimate the position and velocity of a satellite. In other words, the state variables (position and velocity) of a satellite are estimated based on measurement data, such as tracking data. An OD method may be applied by an OD process tool commonly referred to as a filter, as is explained in further detail with reference to FIG. 2. Numerical OD methods may achieve a substantial improvement in accuracy, at the price of having to propagate stepwise forward in time and also at the price of a high computational load.

In the first step 102 of the OD operation 110, an orbit of the satellite is estimated based at least on the tracking data received in step 101. The output of step 102 may also be referred to as filtered ephemerides. In the second step 103, future ephemerides data is predicted based on the estimated orbit (or filtered ephemerides). The predicted future orbit ephemerides may correspond to a satellite's future state at any time, such as in the near future and/or 24 hours or more into the future. The predicted future ephemerides data may provide a 5 second resolution and/or contain data for 24 hours or more. The predicted future ephemerides data may contain data corresponding to at least two or more full orbit periods.

In one example of the OD operation 110, two types of filters (statistical processes) are applied in a process including the following steps:
1) BWLS (Bayesian weighted least-squares)—this is basically a curve fitting process. It does not use any dynamic model and is used to give a better initial guess in order to move to a next filtering step. Here all the tracking data is processed at once.
2) The next step is OSF (ordered statistics filtering)—this is a Kalman filter—here the data is processed sequentially. A dynamic model is used here in order to make the most accurate update. Best state minimizes the state estimate uncertainty. Uncertainty of the model is determined from the size and variability of this uncertainty (Process Noise). Here we are moving from old data to the newer data.
3) Second OSF—also called a smoother. Same as (2) but inverted in time. The Kalman filter is trying, in general to minimize state uncertainty having the knowledge of the previous state's convergence (uncertainty level) and is using the dynamic model in order to create the best guess.

At operation 104, the accuracy of the results of the OD method at operation 110 is verified. To verify that the prediction is accurate, the uncertainty must be low. Only then does good knowledge of the orbit exist, and the prediction is accurate enough to be used as a basis for controlling the satellite in orbit. The verification step 104 is optional and may be applied prior to generating and transmitting the auxiliary data in steps 105, 106. For example, the verification step 104 may be performed only in cases when the tracking data received in step 101 contains one or more gaps. If the verification yields poor accuracy, the OD method at operation 110 may be repeated and/or paused until further tracking data for the satellite is received. If it has been verified that the prediction is accurate, auxiliary data for the satellite is generated.

At operation 105, auxiliary data comprising predicted future ephemerides data for the satellite is generated. A resolution of the auxiliary data is lower than the resolution of the predicted future ephemerides in step 103. The resolution of the auxiliary data represents a compromise between the amount of data that can be successfully uploaded and stored on the satellite (e.g., as a result of uplink bandwidth restrictions and on-board memory constraints) and the amount of data that is needed to prevent the satellite from deviating from its true orbit. The auxiliary data may for example provide a 5 minute resolution and/or contain ephemerides data for at least one full orbit period.

At operation 106, the generated auxiliary data is transmitted to the satellite for use in the satellite's attitude and orbit control. Auxiliary data may be transmitted to the satellite at every ground station pass, every other ground station pass, or according to any other schedule. For example, auxiliary data may be transmitted to the satellite only if there is time left after other priority transmissions are made since the auxiliary data may be used only in the case of a loss of GPS signal. The satellite may also pass over one or more ground stations during the course of an orbit. Thus auxiliary data may be transmitted to the satellite once per orbit, less than once per orbit, or more than once per orbit. The on-board use of the auxiliary data for obtaining accurate knowledge of satellite position is described in further detail with reference to FIGS. 2 and 3. The auxiliary data is configured for substituting GPS measurements during, for example, GPS outages and is used to initialize an internal orbit propagator.

The method 100 prevents the satellite from deviating from its true orbit, when GPS is unavailable. The auxiliary data allows it to maintain precise attitude and orbit control, even if GPS is invalid or unavailable for an extended period of time. During this period of time, the satellite is still able to perform payload and orbit maintenance operation, which would otherwise not be possible. The method 100 allows the satellite to always have precise orbit knowledge on-board, with or without GPS. This allows it to perform scheduled payload activities with very good geolocation accuracy. In addition, the prohibitively high computational load for constantly estimating and predicting the orbit knowledge on-board the satellite is avoided.

Figure 2:
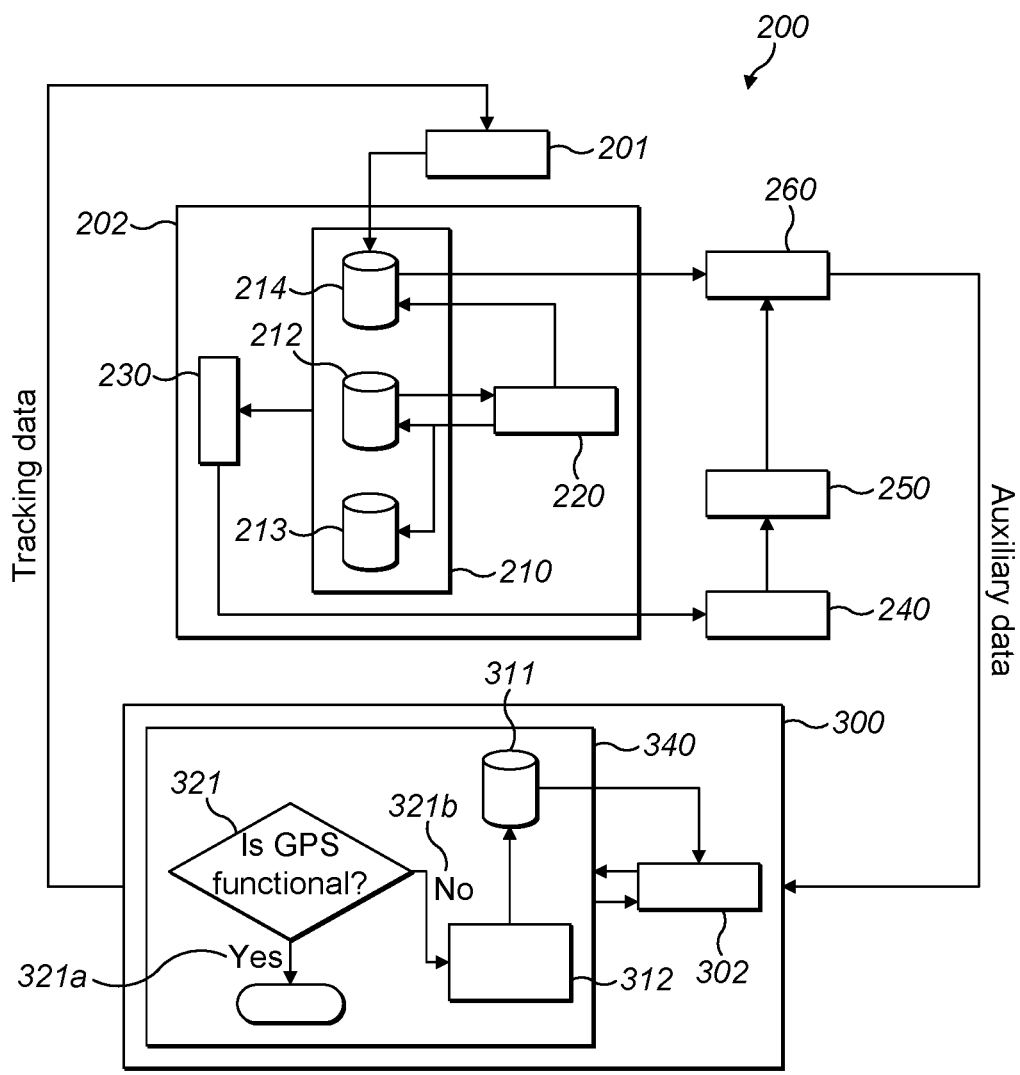
FIG. 2 is a schematic diagram of a satellite and ground segment, wherein the ground segment is configured to generate auxiliary data and the satellite is configured to use the auxiliary data to obtain precise knowledge of position on-board the satellite.

FIG. 2 illustrates a system comprising a ground segment 200 and a satellite 300. Tracking data and auxiliary data may be exchanged between the ground segment 200 and the satellite 300 at every ground station pass. FIG. 2 illustrates the components necessary to generate the auxiliary data and how the auxiliary data is used on-board the satellite to control the satellite 300. The ground segment 200 is configured to perform the method 100 as described with references to FIG. 1. The same ground segment 200 may be used to generate and provide auxiliary data to a plurality of satellites, for example in a constellation otherwise known as a fleet.

As shown in FIG. 2, the (distributed) ground segment 200 comprises a ground station 201 at a different terrestrial location than a ground automation 202. Alternatively, the ground station 201 may be located at the same location as the ground automation 202 of the ground segment 200. Additionally, the ground automation 202 of the ground segment 200 may be hosted and run using a cloud computer provider. The ground station 201 is configured to receive tracking data from the satellite 300. In this embodiment, the tracking data originates from the satellite 300. In alternative examples, the ground automation 202 may use tracking data of radar or laser ranging devices from Earth stations. From the ground station 201, the tracking data is routed to the ground automation 202.

The ground automation 202 includes a receiving module (not shown as separate component) configured to receive the tracking data for the satellite 300, an orbit determination tool kit 'ODTK' 210 configured to apply an orbit determination algorithm, an auxiliary data module 260 configured to generate auxiliary data, and a transmitting module (not shown as separate component) configured to transmit the auxiliary data to the satellite 300. Similarly, as described for the ground station 201 at the receiving end, from the transmitting module the auxiliary data may be transmitted to a satellite via a ground station, e.g. ground station 201 at a different or same terrestrial location than the ground automation 202.

Whenever new tracking data is received from the satellite 300, an OD server 220 then orchestrates running an OD process tool 210 for determining the orbit. For example, a commercially available software to perform the OD method is the Orbit Determination Tool Kit 'ODTK'. The OD server 220 is configured to control the OD process tool 210, as exemplary illustrated in FIG. 2. The OD process tool 230 may be a software module which may be incorporated into the OD server or may stand alone. The tracking data is also supplied to the OD process tool 210. The OD process tool 210 comprises a filter module 212, a storage module 213 and a prediction module 214. The filter module 212 is generally referred to as an OD filter, configured to filter tracking data in one or more filtering stages to be described further below. The filter module 212 performs the filtering of the tracking data and previously estimated orbit knowledge, if available, to (re)estimate the orbit for the satellite. The results of the estimation, such as previously estimated orbit knowledge, is provided to the storage module 213. For the filtering, the OD process tool may maintain a dynamic model of the movement of the satellite. This model may then be used to predict the position and/or velocity of the satellite at any future point in time and is dynamic in the sense that it is updated regularly. The prediction is performed by the prediction module 214. In some examples, the model may be updated each time one or more tracking data are filtered by the filter module 212 of the OD process tool. Additionally or alternatively, the model may be updated manually by a user of the system.

The desired/predicted attitude of the spacecraft is also used in the OD process in order to fit the satellite's dynamic model. This attitude data may be gathered on every pass of the satellite. The attitude data may be stored, for example, in an attitude file that is appended to on every pass of the satellite. By including attitude data with the state vector data the precise movements of the satellite can be modelled. This precise position model can be combined with state vector measurements (for example GPS measurements), and/or the dimensions of the satellite to improve the reliability and precision of the dynamic model, thereby resulting in a more accurate filtering of data by the OD filter. This consequently improves the accuracy of any predictions made based on the dynamic model and therefore improves the planning of orbital manoeuvres and improves the accuracy of any post-processing of orbital information.

It should be noted here by way of background that an orbit is defined by the six Orbital Parameters: 1. Semi major axis of the eclipse (this is describing the altitude), 2. Inclination, 3. Eccentricity of the eclipse, 4. Argument of Perigee (where the closest point to the earth is located on the orbit arc), 5. Longitude of ascending node, 6. True anomaly. An orbit can be also described by state vector (position, velocity and time) given that by estimating accelerations of the satellite, information about the orbit's state and energy can be derived.

The OD server 220 then runs the prediction, based on the estimated orbit, for predicting future ephemerides data of the satellite. The prediction module 214 may be configured to predict future ephemerides for 24 hours or more. The prediction module 214 may further be configured to predict future ephemerides at any desired resolution, such as between 1 and 5 seconds.

Further, the ground automation 202 includes an OD application programming interface 'API' 230. Here, tracking data for the satellite, typically in individual files and sometimes received from different ground stations, is compiled into a dataset accessible via the API 230 and searchable by time range. For this purpose the data may be organised in time sequential order. Via the API, an evaluation process may be triggered. For this purpose, the API may have access to the data of the filter module 212, storage module 213 and/or prediction module 214. A slackbot 240 and/or an operator 250 may assist in verifying the accuracy of the results produced by the OD process tool 210. The slackbot 240 may provide a link to download to the filtered and/or predicted ephemerides and results of a filter consistency test. The auxiliary data module 260 may be configured to generate auxiliary data based on the predicted future ephemerides only if the results produced by the OD process tool are acceptable and/or have been approved. The auxiliary data module 260 may include a downconverter (not shown) to reduce the resolution of the future predicted ephemerides, as needed.

The satellite 300 receives new auxiliary data from the ground segment 200, for example at every ground station pass, or according to a different schedule. The new auxiliary data can include future predicted ephemerides covering at least one full orbit period or partial orbital period until the next ground station pass. For this purpose, the satellite 300 includes a receiving module (not shown). A data file comprising the auxiliary data is stored in a memory 311 of an on-board computer 340. Every time the satellite 300 receives new auxiliary data, the whole auxiliary data file stored in the memory 311 may be replaced to save memory resources. If the on-board computer 340 receives the information 321 that the GPS is functional 321a, then the auxiliary data stored in the memory 311 may not be used. If the on-board computer 340 receives the information 321 that the GPS is non-functional 321b, the processor 312 in the on-board computer 340 orchestrates the internal orbit propagator to use predicted ephemerides data from the auxiliary data for initializing the internal orbit propagator. For this purpose, the processor 312 in the on-board computer 340 selects the appropriate predicted ephemerides from the memory 311 and provides it to the satellite's ADCS subsystem 302. The predicted ephemerides is selected such that it is closest to the current on-board computer time. Instead of using the latest GPS measurement data, the internal orbit propagator of the ADCDs 302 uses the predicted ephemerides for orbit propagation. In other words, the auxiliary data is used instead of actual tracking data in case of a GPS outage.

In an example of a GPS outage that may trigger the use of the auxiliary data, some satellites may run into a situation where they lose or are unable to maintain a lock on one or more GPS satellites for a relatively long period of time, such as an hour or more. Further, this problem can repeat itself several times during the course of a day. Particularly, this problem can occur when the satellite is performing a composite manoeuvre, such as a downlink manoeuvre. Around this activity, the number of tracked GPS satellites can suddenly drop from a nominal value of around 15 to zero. Further, it may take some time for the GPS lock to be restored, even after returning back to the nominal flight attitude when the GPS antenna is pointed towards Zenith, in which case it should have a good view of the GPS satellite constellation.

Figure 3:
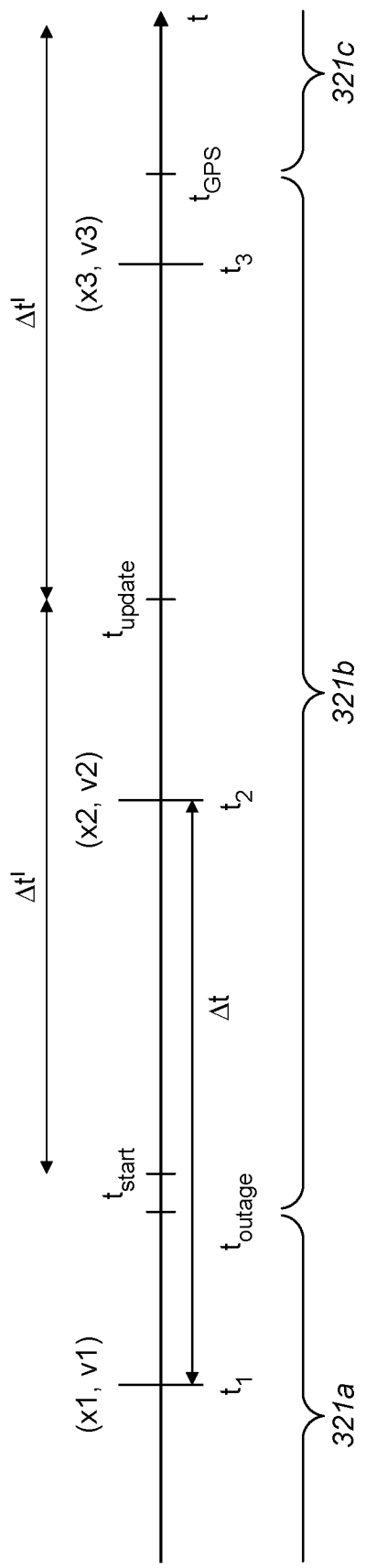
FIG. 3 visualises the on-board use of auxiliary data in a scenario in which the satellite's GPS receiver is temporarily inactive.

The use and availability of auxiliary data on board the satellite for determining a current position of the satellite based on the auxiliary data is further explained with reference to FIG. 3. In this scenario, the satellite experiences a GPS outage, i.e. the GPS module transitions from functional 321a to non-functional 321b and back to functional 321a. The auxiliary data file contains the future predicted ephemeris at every Δt, for example, a 5 minute resolution. Accordingly, the auxiliary data file contains the predicted ephemerides x, v (comprising both position and velocity data) at times $t_1$, $t_2$, $t_3$ and so on. At a 5 minute resolution, a gap Δt of 5 minutes exists between consecutive ephemerides. If the satellite loses tracking data at a time $t_{outage}$, i.e. the on-board GPS receiver is unable to maintain a lock on the GPS satellite signals, the on-board computer's flight software (OBC) selects the latest predicted ephemeris (x1, v1) corresponding to time $t_1$ and provides this to the ADCS system. The ADCS system computes its current position and velocity based on the predicted ephemeris (x1, v1) from the OBC and then proceeds to numerically propagate the orbit information until it receives an update. A short offset period may be present between the GPS outage at $t_{outage}$ and the ADCS system computing its current position based on the auxiliary data at $t_{start}$. The next update would be tracking data if it becomes available again, and if not, then the OBC continues to provide predicted ephemeris to the ADCS system. After a predetermined time interval Δt' has lapsed, which may be identical to the time interval Δt as depicted in FIG. 3, the on-board computer may select again the latest predicted ephemeris (x2, v2) corresponding to time $t_2$. Accordingly, the ADCS system computes at a time $t_{update}$ the current orbit information for the current time based on the ephemeris (x2, v2) provided by the OBC from the auxiliary data and then keeps numerically propagating this information on its own until the next update is provided by the OBC. The process may be repeated for as long as the GPS remains unable to obtain any GPS information on the satellite's location. In the scenario depicted in FIG. 3, the GPS reacquires a lock at $t_{GPS}$, and after that, the ADCS system will receive GPS measurements and compute its current position and velocity based on the latest GPS measurement. In this case, the predicted ephemerides (x3, v3) at $t_3$ will not be sent to the ADCS system.

Figure 4:
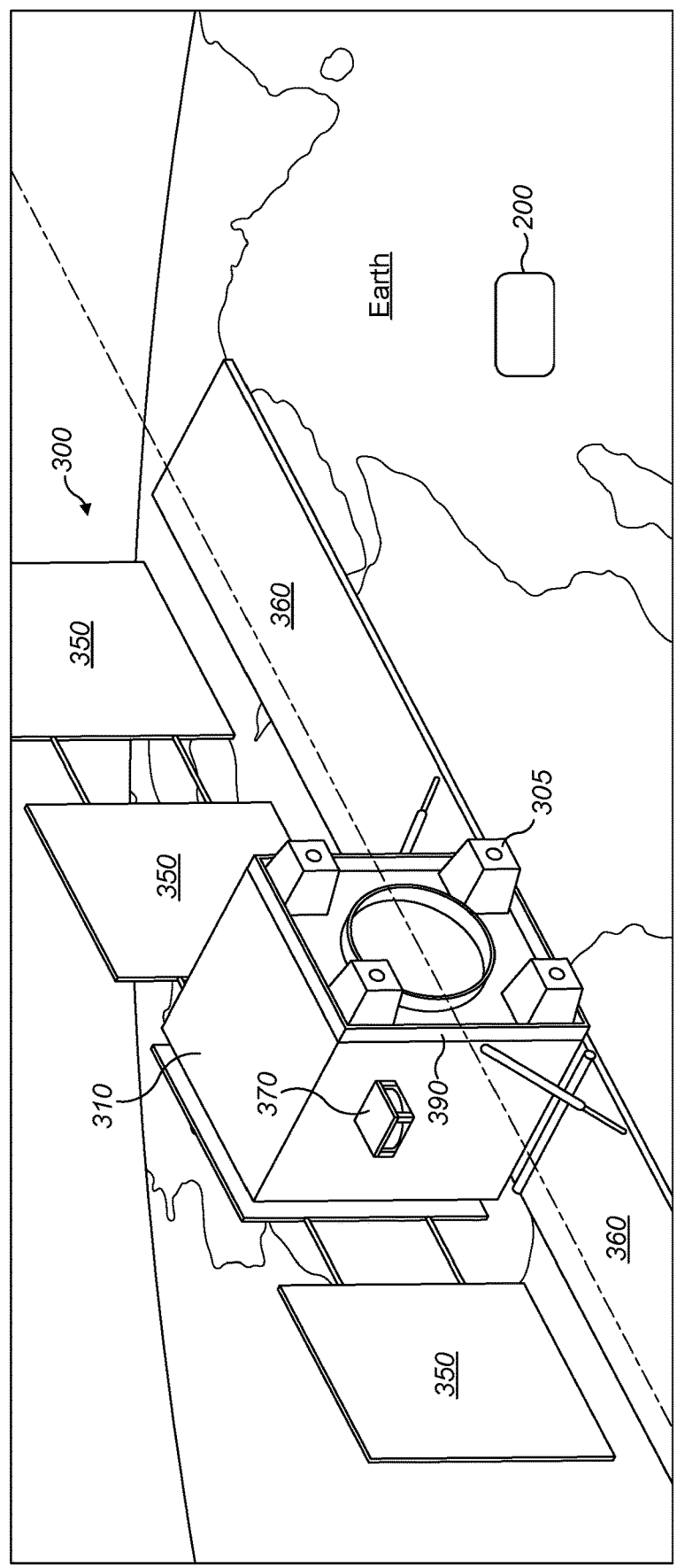
FIG. 4 is a perspective view of a satellite including an ADCS unit for controlling the satellite travelling in orbit around Earth.

FIG. 4 is a perspective view of a satellite 300 in orbit over Earth as an example of a platform which may use the auxiliary data on-board. The ground segment comprising all the ground-based elements of the spacecraft system is indicated at 200. The ground segment 200 enables control of the satellite 300 travelling in orbit around Earth as well as distribution of payload data and telemetry. The satellite 300 comprises a body 310, solar panels 350 and "wings" 360. The satellite 100 further comprises an attitude determination and control system 'ADCS' unit, which may be provided with one or more reaction wheels, one of which is indicated at 370. The ADCS unit is further described with reference to FIG. 5. The reaction wheel 370 will exert force of torque on the satellite body 310. The ADCS unit is used to control the satellite travelling in orbit, that is to bring the satellite 300 into a desired orientation and to maintain it.

A satellite, for example satellite 300 of FIG. 4, is generally provided with a propulsion system 390 for manoeuvring the satellite with a generated thrust. The propulsion system 390 as shown in FIG. 3 is mounted on the body 310 on the surface opposite the solar panels 350. The propulsion system 390 comprises a plurality of thrusters 305. The four thrusters 305, depicted in the example of FIG. 4, are configured to produce thrust for manoeuvring the satellite when required. The thrusters 305 are generally operated to maintain the satellite 300 in a particular orbit. For example, the thrusters 305 may be used to propel the satellite 300 in a particular direction with respect to the surface of the Earth.

The satellite shown in FIG. 4 may be a micro satellite or a small satellite, whose smaller size and greater agility may allow it to be manoeuvred in its entirety to change its attitude. This kind of manoeuvre may be performed using the ADCS unit. In an example, satellite 300 may be a micro satellite with a mass of 100 kg. Regular satellites having a mass of approximately 1000 kg are generally more expensive and less agile than micro satellites. Satellites may be categorised according to their mass. For example, a satellite having a mass between approximately 1 kg and approximately 10 kg may be categorised as a cube satellite; a satellite having a mass between approximately 50 kg and approximately 250 kg may be categorised as a micro satellite; a satellite having a mass of approximately 500 kg may be categorised as a small satellite; and a satellite having a mass between approximately 800 kg and approximately 1200 kg may be categorised as a regular satellite.

Figure 5:
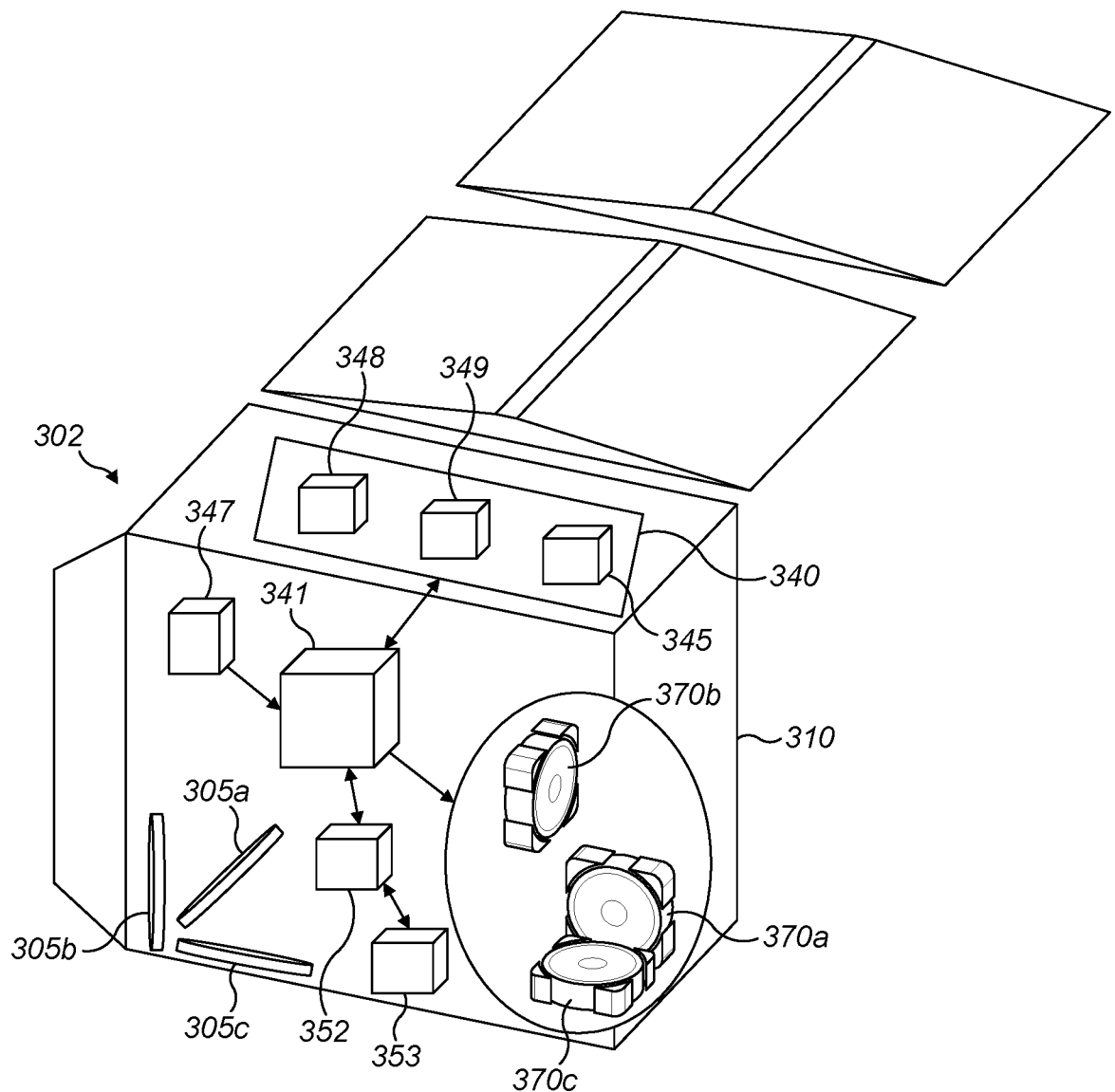
FIG. 5 is a partial perspective view of the satellite according to FIG. 4 depicting its components for controlling the satellite's attitude.

While larger satellites may provide the opportunity to implement numerical methods, so called "orbit filters" on-board the satellites, it may not be feasible to implement orbit filters that provide satisfying results on smaller satellites, such as micro satellites. For smaller and less expensive satellites, the design options are limited due to weight and/or size restrictions or the use of commercial off-the-shelf components FIG. 5 is a partial perspective view of a satellite. The ADCS 302 is usually located in the satellite body 310 and used to control the orientation of the satellite. The components of the ADCS 302 unit are explained with reference to FIG. 5.

The ADCS unit 302 comprises a set of three reaction wheels 370a, 370b, 370c located in the satellite body 310. Reaction wheels are sometimes also known as momentum wheels. The reaction wheels 370a, 370b, 370c are controlled by the ADCS controller 341. Reaction wheels 370a, 370b, 370c function by using an electric motor to spin a wheel inside the spacecraft body 310. By conservation of angular moment, spinning the wheel in one direction causes the spacecraft to rotate in the opposite direction. Using reaction wheels is a well-known way of orienting spacecraft such as satellites. In this example, three reaction wheels 370a, 370b, 370c are provided, one for orienting the satellite 300 in each axis. The reaction wheels 370a, 370b, 370c are shown to have orthogonal axes. In another example, four or more reaction wheels may be used in order to have better control over various aspects of the satellites dynamics, such as slew rate and fine positioning control, particular for satellites with higher moments of inertia.

The ADCS unit shown in FIG. 5 further comprises torque rods 305a, 305b, 305c. Torque rods can also be used in satellites to provide attitude control. The torque rods 305a, 305b, 305c are generally operated to maintain the satellite 300 in a particular attitude, wherein the operation is controlled by the ADCS controller 341, which is explained below.

The ADCS unit 302 further comprises an ADCS controller 341. The ADCS controller 341 is in communication with the on-board computing system 340. The on-board computing system 340 comprises a processor 349, a memory 348 and a telemetry unit 345. The memory 348 can be used to store the auxiliary data (similarly to memory 311 in FIG. 2). The telemetry unit 345 may be configured to transmit telemetry data including tracking data to a ground station, such as ground station 201 in FIG. 2, at every ground station pass. The ADCS controller 341 is further configured to receive information from or more sensors 347. The one or more sensors 347 are configured to measure various quantities during the flight of the satellite, such as sun-sensor or magnetometer for measuring local magnetic field. The ADCS controller 341 is further in communication with a GPS receiver module comprising a GPS receiver 352 and a GPS antenna 353. The GPS receiver module may be a commercial off-the-shelf GPS receiver.

To properly control the satellite 300 travelling in orbit around Earth, the ADCS controller needs to know the satellite's true position as precisely as possible. For this purpose, the ADCS controller 341 further runs orbit propagation software, which is also referred to as an (internal) orbit propagator. The ADCS controller 341 including the orbit propagator may be a commercial off-the-shelf product. If the GPS module is functional, the ADCS controller 341 is configured to compute its current position and velocity based on the latest GPS measurement received from the GPS receiver 352. While the GPS module maintains a lock, GPS measurements are typically repeated every 30 seconds. Accordingly, the internal orbit propagator is repeatedly initialized with new GPS measurements and continues to perform numerical propagation based on the GPS measurements. If the GPS module stops working temporally or permanently for any reason, such as in the example of FIG. 3, the on-board computing system 340 selects an ephemerides data point from the auxiliary data stored in the memory 348 according to the on-board time on the satellite. In one example, the auxiliary data comprises predicted future ephemerides data every 5 minutes. If the on-board computing system 340 receives a notification from the ADCS controller 341 that the GPS is non-functional, it selects the ephemerides data closest and elapsed based on the on-board time and provides it to the ADCS controller 341. The ADCS controller 341 then computes its current position and velocity based on the received ephemerides data from the on-board computing system 341 and proceeds to numerically propagate the orbit information until it receives the next update. The next update may either be a GPS measurement, if the GPS module has re-acquired a lock, or the next predicted ephemerides data point of the auxiliary data. In the latter case, the internal orbit propagator may be initialized with a new predicted ephemerides data every 5 minutes or whenever a new ephemerides data point is available.

In an example, the certainty of the future predicted ephemerides as well as the results determined by the internal orbit propagator based on the uploaded auxiliary data have been tested by way of simulation. To this end, it is assumed that the filtered GPS receiver's measurements are substantially more precise than the predictions, and can thus be regarded as the "true" states when compared to the results. The results of the simulations are explained with reference to the FIGS. 6 to 9.

Figure 6:
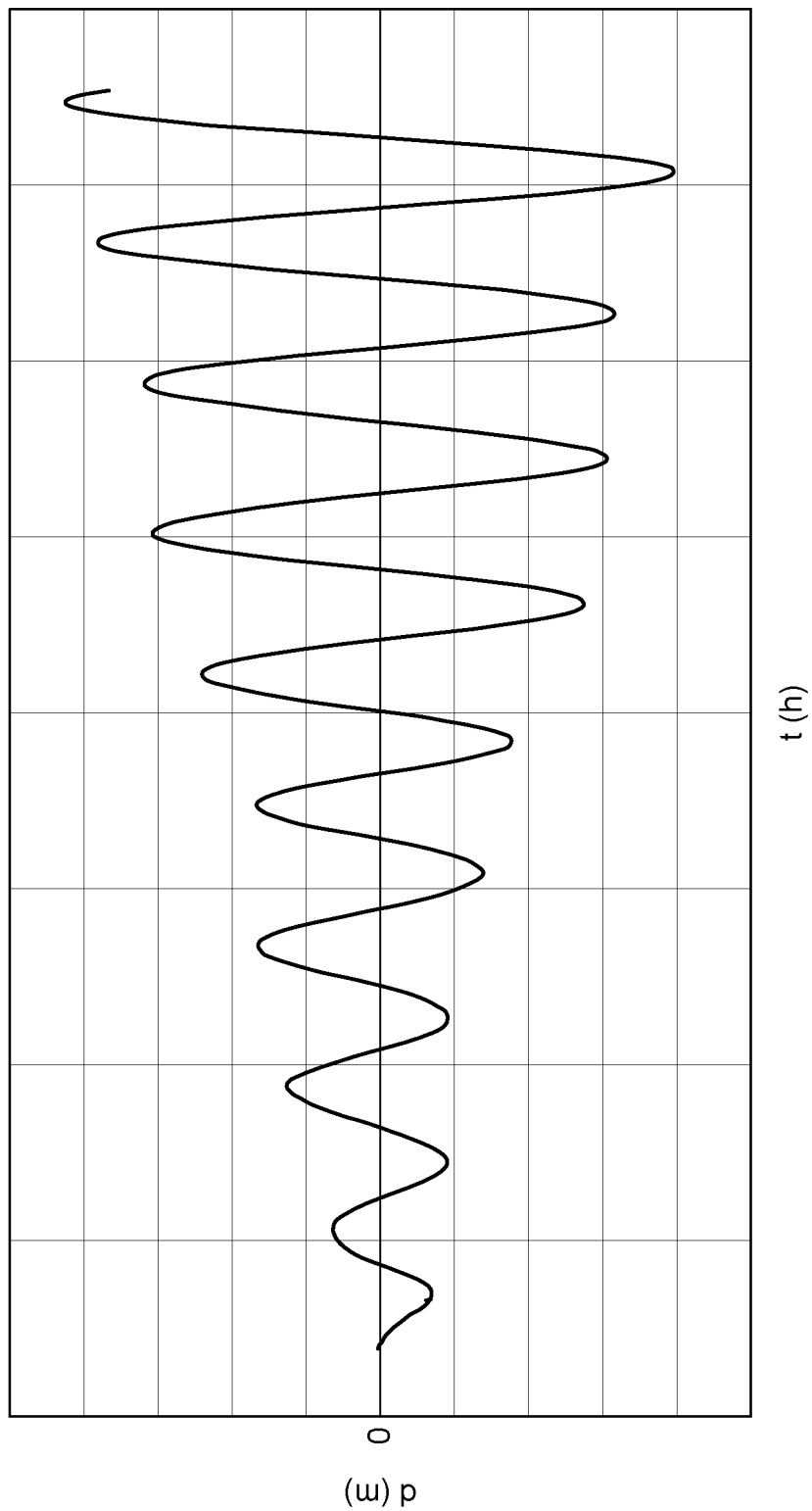
FIG. 6 shows test results comparing a position determined by an internal on-board propagator based on auxiliary data with true orbit data based on GPS measurements.

FIG. 6 shows a plot of the difference in position between the position data determined by the on-board orbit propagator based on the auxiliary data, i.e. the on-board knowledge of satellite position, and the true orbit, i.e. the filtered tracking data, such as filtered GPS measurements. With regard to FIG. 6, an increment on the y-axis corresponds to 20 meters, wherein an increment on the x-axis corresponds to 2 hours. To evaluate the deviation between the on-board knowledge based on the auxiliary data and the true orbit, the GPS lock was removed for a period of at least 12 hours. As can be seen in FIG. 6, if the ADCS' internal orbit propagator is initialized with the auxiliary data generated according to the method as explained with reference to FIG. 1, the on-board knowledge of the satellite is very accurate for a period of around 15 hours. Even though the peak deviations can be seen to be increasing during this time, the deviation in the position still does not reach more than 80 meters, which is acceptable for many payload requirements. A position error of 80 meters is well within the requirements of 500 m as specified for SAR imaging. Without the auxiliary data, the deviation could be much higher, for example 6000 m, in a similar time frame. The auxiliary data can allow the satellite to continue its mission by allowing it to have sufficiently precise knowledge of its position on-board the satellite even during GPS outages.

Figure 7:
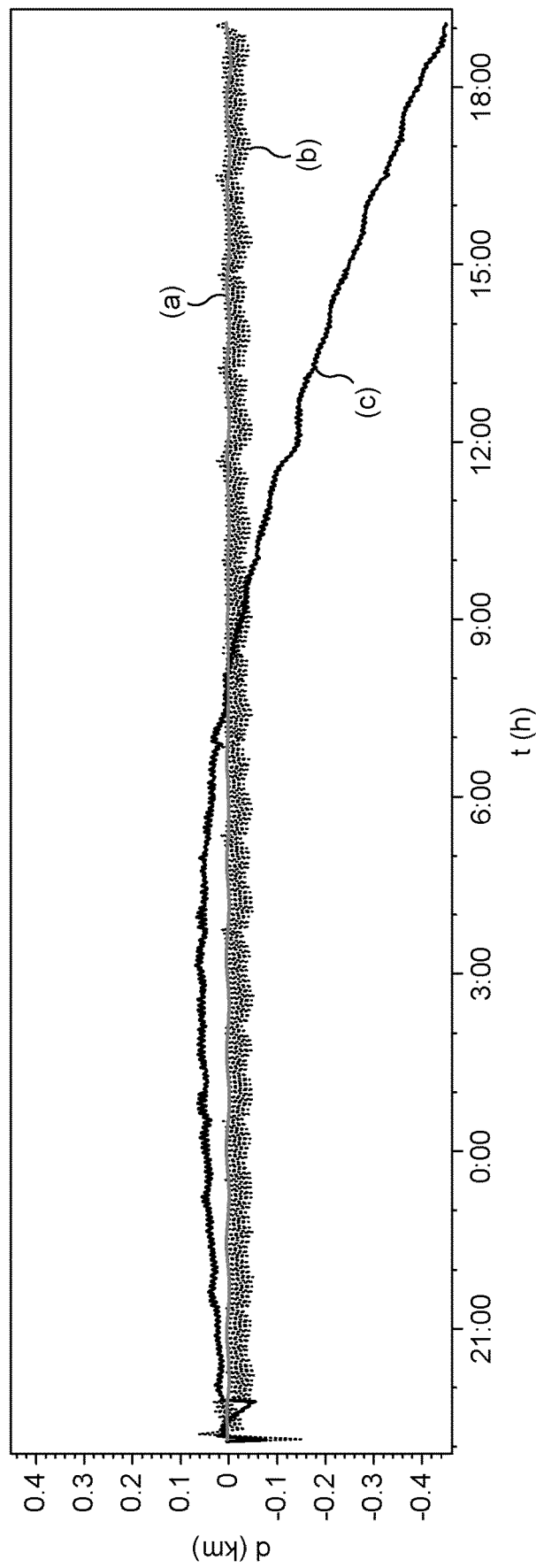
FIG. 7 is a plot comparing the predicted future ephemerides data with the true orbit.

FIG. 7 shows a plot comparing the predicted future ephemerides data as obtained by the ODTK with the true orbit as measured by the on-board GPS receiver and filtered by the ODTK to reduce noise. Line (a) and line (b) in the diagram correspond to the radial and cross-track direction, respectively. It can be seen in FIG. 7 that the deviation in both directions is negligible over the entire 24 hour prediction. Line (c) corresponds to the in-track direction. As expected, the error in the track of the satellite is slightly more prominent. It can be seen in FIG. 7 that the deviation in the in-track direction is small (less than 100 meter) for at least 12 hours and remains within about 400 meter over the entire 24 hour prediction. Accordingly, the predicted future ephemerides data provides a very high accuracy for at least the first 12 hours and still an acceptable accuracy for the entire 24 hour prediction.

The results of an example of the orbit determination algorithm have been evaluated by the following simulations as described with reference to FIGS. 8 and 9.

Figure 8:
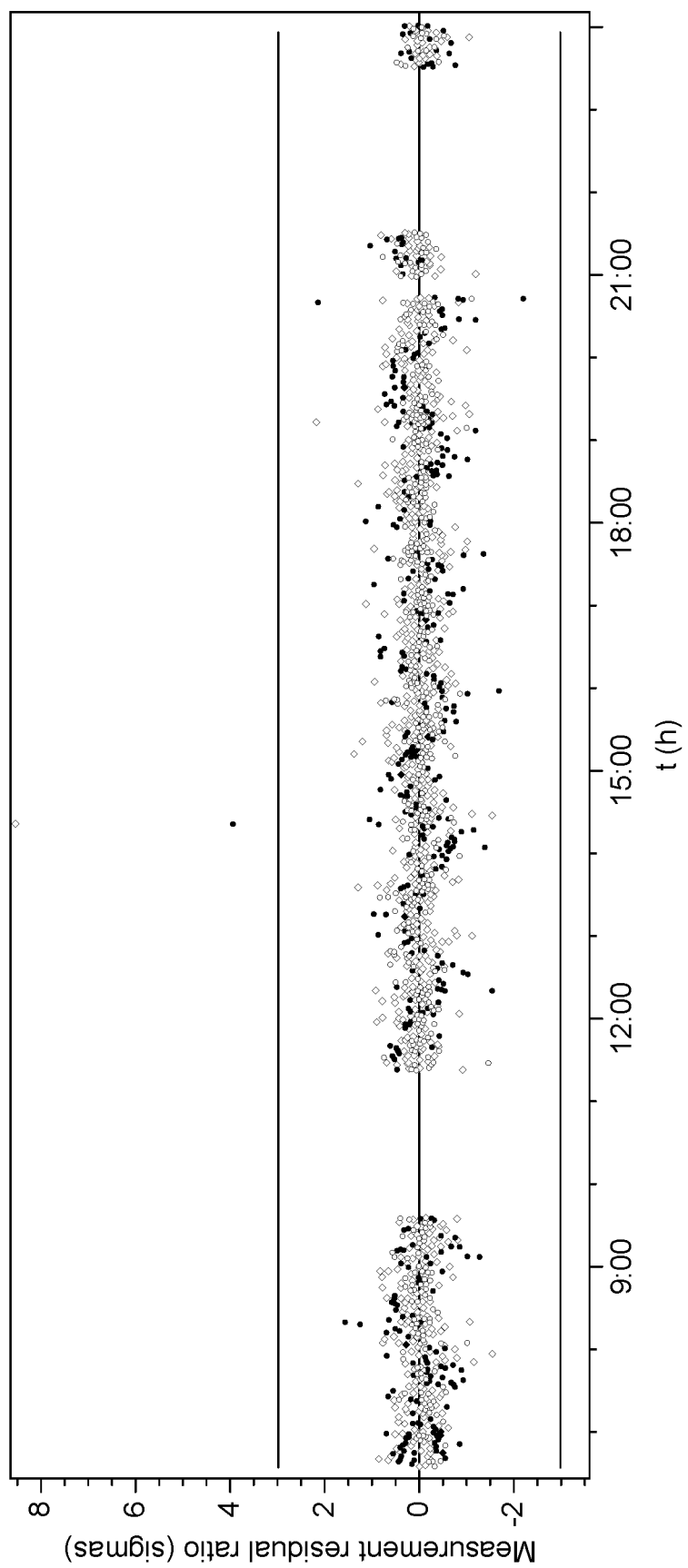
FIG. 8 is a plot illustrating a measurement residual of 24 hours of GPS data.

FIG. 8 shows a plot illustrating a measurement residual ratio of a plurality of GPS measurements over a time period of 24 hours (about 17-18 hours of which are shown in FIG. 8). As can be seen in FIG. 8, the GPS data comprises at least two gaps of more than one hour (a first gap between about 9:30 and 11:30 and a second gap between about 21:30 and 23:30). The gaps may correspond to GPS tracking outages on-board the satellite. In FIG. 8, different shaped and style of data points represents the x-, y- and z-components of position and velocity vector, respectively. Measurement residual ratios that lay outside the three sigma limits (boundary lines in FIG. 8) are not considered as accurate measurements and are therefore disregarded.

Figure 9:
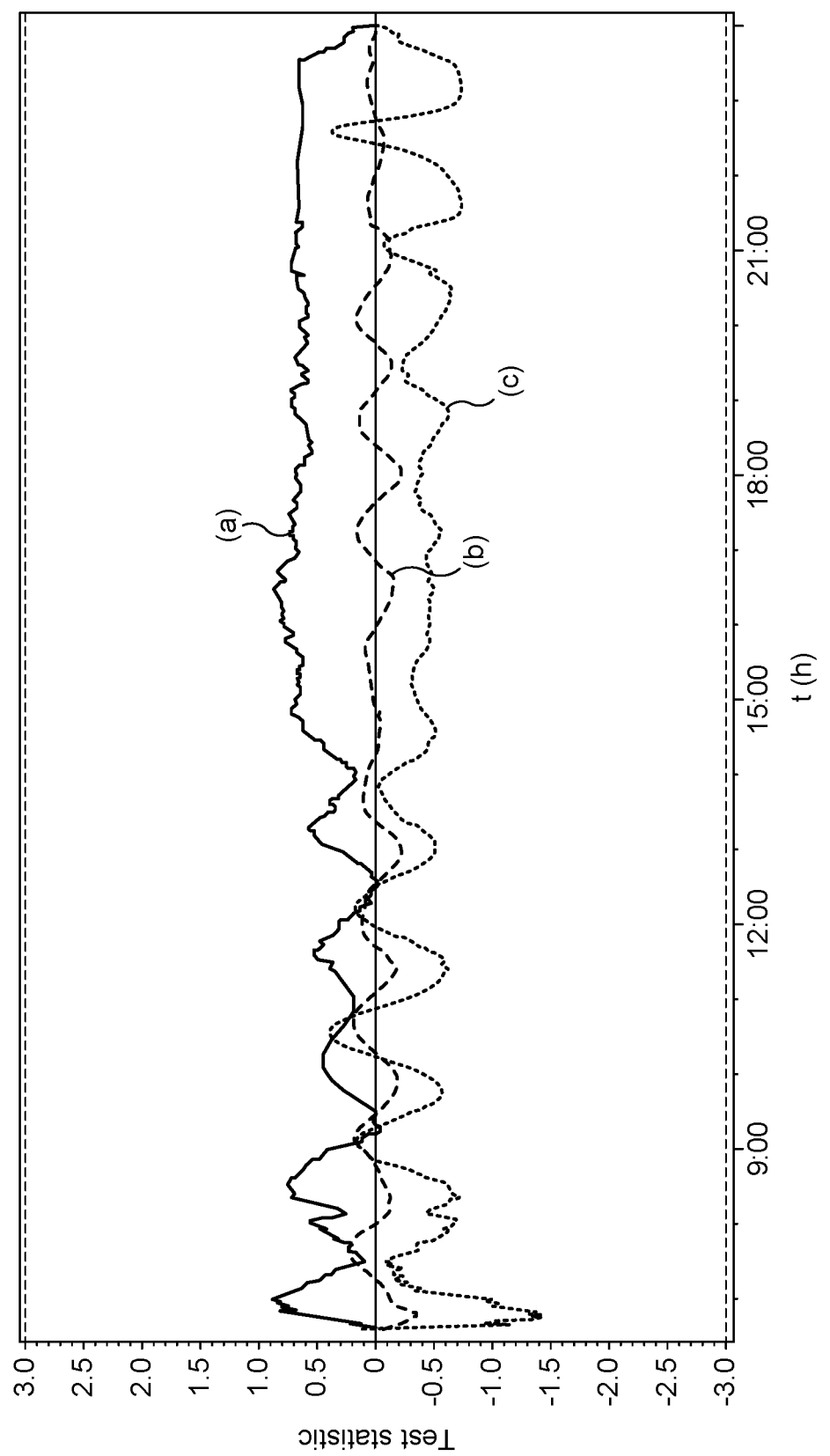
FIG. 9 is a plot illustrating a position consistency statistic in accordance with FIG. 8.

FIG. 9 shows a plot illustrating a position consistency statistic (test statistic) of the results of the orbit determination based on the GPS measurements shown in FIG. 8. The consistency test is used to evaluate the quality of the orbit determination. As can be seen in FIG. 9, even during time periods that correspond to the GPS outages (such as between about 9:30 and 11:30 and between about 21:30 and 23:30 as shown in FIG. 8), the estimation algorithm works without actual measurements. Accordingly, the impact of the GPS outages on the orbit estimation are not significant. In FIG. 9, line (a) corresponds to the in-track direction, line (b) corresponds to the radial direction, and line (c) corresponds to the cross-track direction. As can be seen, deviations in the cross-track direction are negligible over the entire 18 hours estimation. Deviations in radial and in-track direction are slightly more prominent but also stable over the propagation time of 18 hours, despite being generated from GPS measurements that had gaps of two or more hours within it. Based on the test statistic shown in FIG. 9, one can barely make out any difference between the GPS measurement periods and the non-GPS measurement periods. As the orbit determination provides the basis for the uploaded auxiliary data comprising the predicted future ephemerides data, it can be deduced that these predictions are accurate even if the tracking data comprises gaps due to GPS outages. This demonstrates the accuracy of the orbit determination and the resulting auxiliary data even when it is based on an imperfect record of actual GPS measurements.

The above description discusses embodiments of the invention with reference to a single satellite for clarity. It will be understood that in practice the system may be shared by a plurality of satellites, and possibly by a very large number of satellites simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a ground automation system, it is to be understood that the computing device of the ground automation may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A method of generating auxiliary data for controlling a satellite travelling in orbit around Earth, the method comprising:
    receiving tracking data for the satellite;
    applying an orbit determination algorithm including:
        estimating an orbit for the satellite based on the tracking data, and predicting, based on the estimated orbit, future ephemerides data of the satellite;
    generating auxiliary data comprising predicted future ephemerides data;
    transmitting the auxiliary data to the satellite for use in control of an attitude and an orbit of the satellite; and
    determining a current position of the satellite based on the predicted future ephemerides data comprised in the auxiliary data when GNSS or GPS sensor data on board the satellite is not available or not reliable, and using the current position to control the satellite's attitude and orbit,
    wherein at least the applying the orbit determination algorithm and the generating the auxiliary data are performed ground-based.

2. The method as claimed in claim 1, wherein the tracking data comprises Global Navigation Satellite System 'GNSS' sensor data, satellite laser ranging 'SLR' measurements or radar measurements of the satellite.

3. The method as in claim 1, wherein the tracking data is indicative of a series of time and corresponding position and velocity of the satellite.

4. The method as claimed in claim 1, wherein estimating the orbit for the satellite is further based on a previously estimated orbit.

5. The method as claimed in claim 1, wherein the tracking data corresponds to a predetermined time interval, optionally corresponding to the time between two ground station passes of the satellite.

6. The method as claimed in claim 5, wherein the tracking data comprises one or more gap(s) corresponding to one or more tracking outage(s) during the predetermined time interval.

7. The method as claimed in claim 1, wherein the method is repeated at every pass of the satellite, such that tracking data is received per pass of the satellite and the generated auxiliary data is transmitted per consecutive pass of the satellite.

8. The method as claimed in claim 1, wherein the method is repeated in parallel for a plurality of satellites.

9. The method as claimed in claim 1, wherein the auxiliary data comprises predicted futures ephemerides in temporal intervals of up to a maximum interval equal to one of one minute, two minutes, and 5 minutes, spanning over a time period that is less than or equal to 6 hours, 12 hours, or 24 hours.

10. The method as claimed in claim 1, wherein the auxiliary data comprises predicted future ephemerides covering at least one orbital period of the satellite.

11. The method as claimed in claim 1, wherein estimating the orbit includes filtering the tracking data to provide filtered ephemerides of the satellite.

12. The method as claimed in claim 11, wherein predicting future ephemerides data of the satellite includes a propagation forward in time from the filtered ephemerides.

13. A ground segment for generating auxiliary data for controlling a satellite travelling in orbit around Earth, wherein the ground segment is configured to perform the method of claim 1.

14. A ground segment for generating auxiliary data for controlling a satellite travelling in orbit around Earth, the ground segment comprising:
    a receiving module configured to receive tracking data for the satellite;
    an orbit determination tool kit 'ODTK' configured to apply an orbit determination algorithm including: estimating an orbit for the satellite based on the tracking data, and predicting, based on the estimated orbit, future ephemerides data of the satellite;
    an auxiliary data module configured to generate auxiliary data comprising predicted future ephemerides data; and
    a transmitting module configured to transmit the auxiliary data to the satellite for use by an attitude determination and control systems 'ADCS' unit of the satellite, to determine a current position of the satellite based on the predicted future ephemerides data comprised in the auxiliary data when GNSS or GPS sensor data on board the satellite is not available or not reliable, and using the current position to control the satellite's attitude and orbit, herein at least the applying the orbit determination algorithm and the generating the auxiliary data are performed ground-based.

15. The ground segment of claim 14, wherein components of the ground segment are distributed over multiple locations.

16. Use of the ground segment as claimed in claim 14 for generating auxiliary data to control one or more satellite(s) travelling in orbit around Earth, wherein each of the one or more satellite(s) is configured to determine its position based on the auxiliary data.

17. A satellite for travelling in orbit around Earth, the satellite comprising:

a receiving module configured to receive auxiliary data generated for the satellite according to the method of claim 1; and an attitude determination and control systems 'ADCS' unit for controlling the satellite in orbit, wherein the ADCS unit is configured to determine a current position of the satellite based on the auxiliary data.

18. The satellite of claim 17, further comprising:

an on-board computer, wherein the on-board computer is configured to select a latest predicted ephemerides data from the auxiliary data based a current on-board time of the satellite, and an orbit propagator forming part of the ADCS unit configured to numerically propagate the selected predicted ephemerides data based on the current on-board time to determine a current position of the satellite.

19. The satellite of claim 17, the satellite further comprising a tracking module for tracking the satellite, wherein the tracking module is a GPS sensor module, wherein the ADCS unit is further configured to determine a current position of the satellite based on sensor data of the tracking module, wherein and the ADCS unit is configured to switch from the sensor data to the auxiliary data if the tracking module is non-functional.

20. The satellite of claim 17, wherein the satellite is a microsatellite and/or a radar satellite for earth observation.

* * * * *